United States Patent [19]

Kull

[11] Patent Number: 5,681,015
[45] Date of Patent: Oct. 28, 1997

[54] RADIO-BASED ELECTRO-PNEUMATIC CONTROL COMMUNICATIONS SYSTEM

[75] Inventor: Robert C. Kull, Olney, Md.

[73] Assignee: Westinghouse Air Brake Company, Wilmerding, Pa.

[21] Appl. No.: 771,290

[22] Filed: Dec. 20, 1996

[51] Int. Cl.$^6$ ................................................. B61C 17/12
[52] U.S. Cl. .................... 246/187 C; 246/167 R; 246/182 B; 364/426.05
[58] Field of Search ............... 246/7, 166.1, 167 R, 246/169 R, 187 C, 182 B; 340/901, 902; 369/424.01, 424.03, 426.01, 426.05

[56] References Cited

U.S. PATENT DOCUMENTS

| | | | |
|---|---|---|---|
| 5,039,038 | 8/1991 | Nichols et al. | 246/187 C |
| 5,053,964 | 10/1991 | Mister et al. | 246/187 C |
| 5,374,015 | 12/1994 | Bezos et al. | 246/169 R |
| 5,377,938 | 1/1995 | Bezos et al. | 246/187 C |
| 5,570,284 | 10/1996 | Roselli et al. | 246/187 C |

*Primary Examiner*—S. Joseph Morano
*Attorney, Agent, or Firm*—Whitham, Curtis, Whitham & McGinn

[57] ABSTRACT

A radio-based, Electro-Pneumatic (EP) rail car braking system supports both End-of-Train (EOT) and Distributed Power Control (DPC) communication systems. The EP rail car braking system operates within existing frequency allocations and meets operational reliability needs by adopting a hybrid, two-band communications scheme. The EP rail car braking system uses a broadcast band for transmitting commands to all cars in the train. Selected cars spaced through the train are designated as repeaters, and a predetermined number of cars are assigned to each repeater for form a group of cars that act as a Local Area Network (LAN). The cars in a group communicate with each other using a low power, spread spectrum band. In response to a command broadcast by a lead locomotive, cars in a group act on the command and transmit status information to their repeater car. The repeater car, in turn, sends back status messages to the lead locomotive on the broadcast band based on consolidation of data received from the cars in its group.

17 Claims, 6 Drawing Sheets

RADIO-BASED ELECTRO-PNEUMATIC CONTROL COMMUNICATIONS SYSTEM

BACKGROUND OF THE INVENTION

1. Field of the Invention

The present invention generally relates to intra-train communications for implementing radio-based Electro-Pneumatic (EP) control of railroad train brakes and, more particularly, to a hybrid, two-channel communications scheme for implementing an EP rail car braking system which supports both End-of-Train (EOT) and Distributed Power Control (DPC) intra-train communication systems.

2. Background Description

End of Train (EOT) signaling and monitoring equipment is now widely used, in place of cabooses, to meet operating and safety requirements of railroads. The information monitored by the EOT unit typically includes the air pressure of the brake line, battery condition, warning light operation, and train movement. This information is transmitted to the crew in the locomotive by a battery powered telemetry transmitter.

The original EOT telemetry systems were one-way systems; that is, data was periodically transmitted from the EOT unit to the Head of Train (HOT) unit, sometimes referred to as the Locomotive Control Unit (LCU), in the locomotive where the information was displayed. More recently, two-way systems have been introduced wherein transmissions are made by the HOT unit to the EOT unit. In one specific application, the EOT unit controls an air valve in the brake line which can be controlled by a transmission from the HOT unit. In a one-way system, emergency application of the brakes starts at the locomotive and progresses along the brake pipe to the end of the train. This process can take significant time in a long train, and if there is a restriction in the brake pipe, the brakes beyond the restriction may not be actuated. With a two-way system, emergency braking can be initiated at the end of the train independently of the initiation of emergency braking at the head of the train, and the process or brake application can be considerably shortened. As will be appreciated by those skilled in the art, in order for a HOT unit to communicate emergency commands to an associated EOT unit, it is desirable for the HOT unit to be "armed"; that is, authorized by railroad personnel. This is desirable to prevent one HOT unit from erroneously or maliciously actuating the emergency brakes in another train. To this end the HOT unit includes a nonvolatile memory in which a unique code identifying an EOT unit can be stored. The HOT unit also has a row of thumb wheel switches which allows manual entry of codes. Additional background on EOT systems may be had by reference to U.S. Pat. Nos. 5,374,015 and 5,377,938, both to Bezos et al. and assigned to the assignee of this application.

Another application of intra-train communication is the Distributed Power Control (DPC) communication system. In this system, there are a plurality of locomotives in the consist, a lead locomotive and one or more helper locomotives. Some of the helper locomotives may be located in the consist remotely from the lead locomotive so that control communications cannot be accomplished through the multiple unit (MU) cable that interconnect locomotives in tandem. Communication modules are mounted in each of the plurality of locomotives in a train consist. The communication modules include radio transmitters and receivers, a control module connected to and controlling the radio transmitters and receivers, a user interface connected to the control module for inputting data and commands by a user and outputting information to the user, and a hardware interface connected to the control module for receiving inputs from and outputting commands to a locomotive in which the communication module is mounted. One of the communications modules is designated as a lead unit (mounted in the lead locomotive), and others of the plurality of communications modules are designated as remote units (mounted in the trailing helper locomotives).

The overall strategy of the DPC communication system is for the lead locomotive to transmit commands, including braking commands, and for trailing or remote units to execute the commands and reply with status information. In the normal case, communications interactions are initiated from the lead locomotive; however, trailing units may initiate messages associated with default or alarm conditions.

Ideally, all cars in the train might be equipped with radios. The potential advantages of using radio communications instead of train line cabling for implementation of an Electro-Pneumatic (EP) rail car braking have been demonstrated by the two-way EOT. There are, however, a number of key issues to be resolved to determine the practicality of EP brakes, such as on-board power generation and radio frequency (RF) communications.

The Federal Communication Commission (FCC) allocates blocks of radio frequencies for railroad communications. The Association of American Railroads (AAR) then further allocates the frequencies on a channel basis, which are then used by radio-based intra-train communications systems. Radio-based intra-train communications must conform to these AAR channel standards. The current AAR standard assigns frequencies on a 25 KHz channel basis within the UHF band. There are currently four such channels. The channels are typically assigned as one channel for each train, and communication within those channels is typically half-duplex. The channels are assigned between different trains on a randomized basis to reduce the probability of interference between different trains. However, in view of there being only four channels, the intra-train communication systems must be able to perform with multiple trains within RF range of one another having the same assigned frequency.

Accordingly, there is a need for communication systems that are both resistant to inter-train interference and, because of the limited number and bandwidth of channels, being efficient in the utilization of the available channel. In addition, the communication systems must be flexible to accommodate differing numbers of remote locomotives and other control units arranged within various train consists.

The present invention focuses on the RF communications issues and provides a solution which addresses the following key constraints:

Live within existing American Association of Railroads (AAR) allocations from the Federal Communications Commission (FCC).

Deal with channel capacity and contention issues.

Meet operational reliability needs to support EP brake operation with the brake pipe normally charged (no reductions for brake applications).

Provide security with respect to multiple trains operating in close proximity to each other.

The communications strategy should be able to provide sufficient reliability to allow normal operations with a continuously charged brake pipe. This will provide the ability to perform all functions as available from a cabled system when a train is fully or close to fully equipped. It will also allow conversion to overlay operation to supplement conventional brake pipe reduction operations when trains are only partially equipped or in the event of communications failure within the train.

SUMMARY OF THE INVENTION

It is therefore an object of the present invention to provide a radio-based, Electro-Pneumatic (EP) rail car braking system which supports both End-of-Train (EOT) and Distributed Power Control (DPC) communication systems.

It is another object of the invention to provide a EP rail car braking system which operates within existing frequency allocations and meets operational reliability needs.

According to the invention, a hybrid, two-band communications scheme implements an EP rail car braking system using a broadcast band for transmitting commands to all cars in the train. Selected cars spaced through the train are designated as repeaters, and a predetermined number of cars are assigned to each repeater for form a group of cars that act as a Local Area Network (LAN). The cars in a group communicate with each other using a low power, spread spectrum band. In response to a command broadcast by a lead locomotive, cars in a group act on the command and transmit status information to their repeater car. The repeater car, in turn, sends back status messages to the lead locomotive on the broadcast band based on consolidation of data received from the cars in its group.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

End of Train (EOT) Intra-Train Communication System

Figure 1:
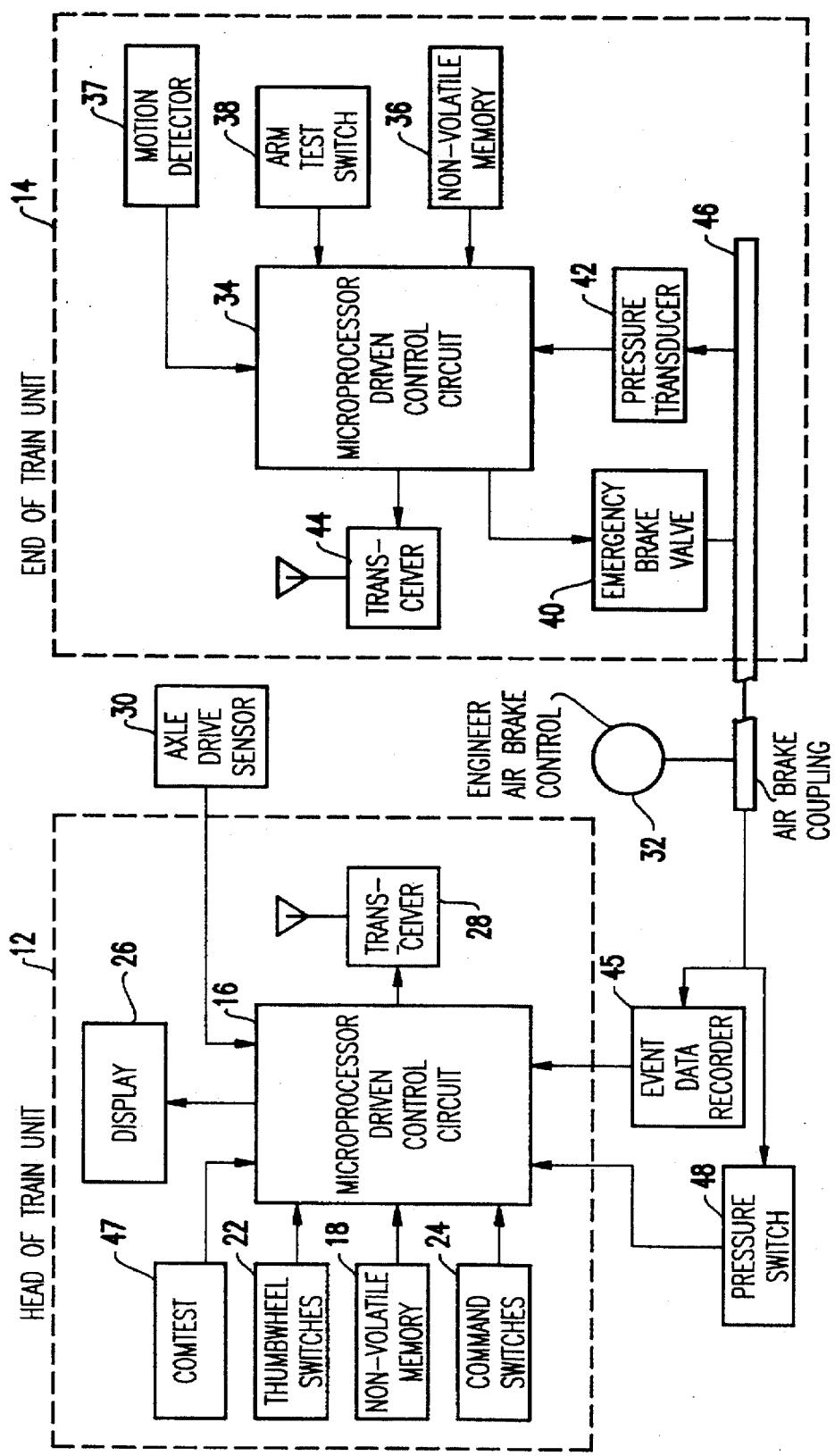
FIG. 1 is a block diagram showing the major component parts of an EOT unit and HOT unit.

Referring now to the drawings, and more particularly to FIG. 1, there is shown a block diagram of a head of train (HOT) unit 12 and an end of train (EOT) unit 14 mechanically linked together by a train (not shown) and communicating by radio broadcast. The EOT unit 14 is typically mounted on the trailing coupler (not shown) of the last car in the train and is equipped with pressure monitoring and telemetry circuitry. A hose is connected between the train's brake pipe and the EOT unit so that the air pressure of the brake pipe at the end of the train can be monitored.

The HOT unit 12 includes microprocessor control circuit 16, a nonvolatile memory 18 which stores the control program for the microprocessor control circuit, and a series of thumb wheel switches 22 through which an operator stationed at the HOT unit can manually enter the unique code number of the EOT unit 14. In addition to inputs from the thumb wheel switches and nonvolatile memory, the microprocessor control circuit 16 also has a command switch input 24 and a communication test (COMTEST) switch input 25 and provides outputs to a display 26 and transceiver 28. A locomotive engineer controls air brakes via the normal locomotive air brake controls, indicated schematically at 32, and the normal air brake pipe 46 which extends the length of the train. Existing HOT units are connected to the locomotive's axle drive via an axle drive sensor 30 which provides typically twenty pulses per wheel revolution.

The EOT unit 14 includes a microprocessor control circuit 34, and a nonvolatile memory 36 in which the control program for the microprocessor controller and a unique identifier code of the particular EOT unit 14 are stored. The microprocessor control circuit 34 also has inputs from a manually activated arming and test switch 38 and a brake pressure responsive transducer 42 and an output to an emergency brake control unit 40 coupled to the brake pipe 46. The EOT unit 14 communicates with radio transceiver 28 of the HOT unit 12 by way of a radio transceiver 44.

In addition, at the front of the train (e.g., the locomotive) there is typically a event data recorder 45 to which is coupled to the brake pipe 46 at the locomotive. An output of data recorder 45 is coupled to the HOT unit microprocessor control circuit 16 so that changes in brake pressure at the locomotive end of the brake pipe are coupled to the microprocessor control circuit 16. According to one aspect of the invention, a pressure switch 48 is also connected to the brake pipe 46 and provides an output directly to the microprocessor control circuit 16. The function of the pressure switch 48, which has a typical threshold on the order of 25 psi, is to sense and communicate to the HOT unit 12 the arrival of an emergency brake application.

Distributed Power Control (DPC) Intra-Train Communication System

Figure 2:
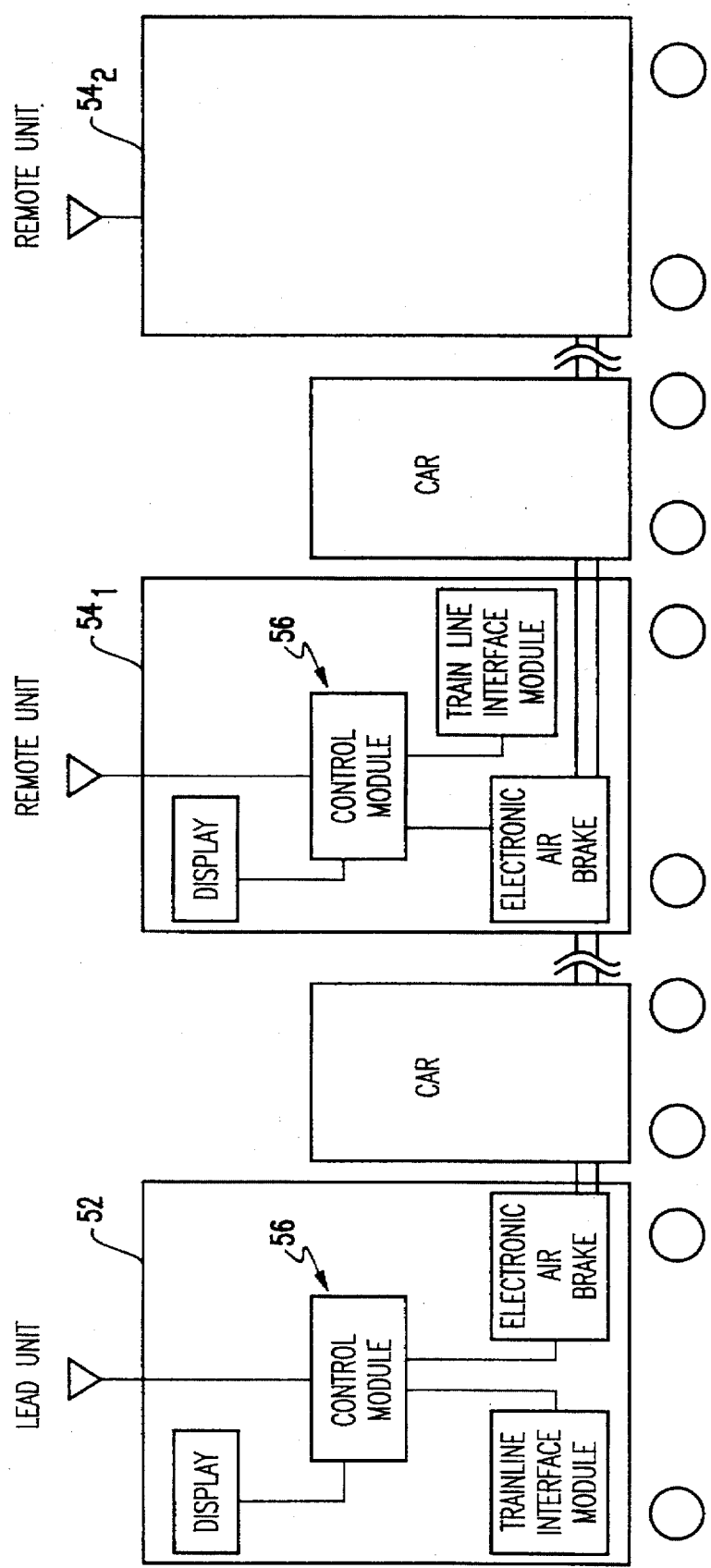
FIG. 2 is a system block diagram of a distributed power control (DPC) communication system.
Figure 3:
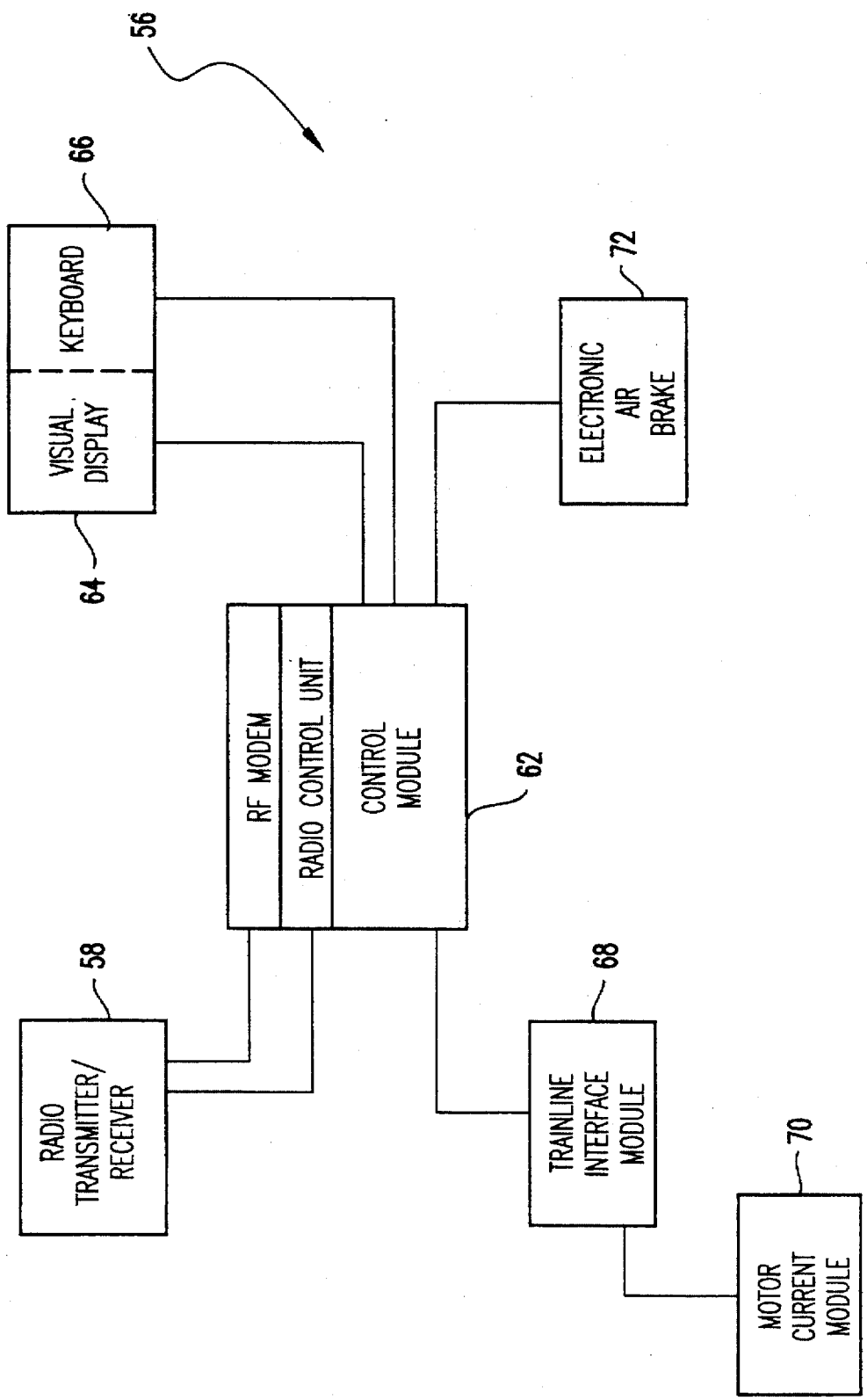
FIG. 3 is a hardware block diagram of a unit which can function as a lead unit or as a remote unit of the DPC system of FIG. 2.

FIGS. 2 and 3 show a DPC intra-train communication system having a lead unit 52 and remote units $54_1$ and $54_2$. For this description a genetic reference to a remote is by $54_i$, and a reference to a specific remote unit is by $54_1$, $54_2$, ... , $54_n$. The lead unit 52 and the remote units $54_1$ and $54_2$, for this example embodiment, are identical hardware units, shown as hardware unit 56 in FIG. 3. As shown in FIG. 2, the lead unit 52 is in one of the locomotives designated as the lead locomotive, and each the remote units $54_1$ and $54_2$ are in remote or trailing locomotives. As explained further below, hardware unit 56 has the capability to operate as a lead unit 52 or a remote unit $54_i$ by its prestoring and then selecting from, in accordance with user commands, a plurality of software programs for a plurality of modes, including that of a lead unit 52 and a remote unit $54_i$. The hardware unit 56 is configured into a lead unit 52 or a remote unit $54_i$ by a simple software selection command executed at some initialization point.

Referring to FIG. 3, each hardware unit 56 comprises a redundant radio transmitter and receiver 58, an RF modem and radio control unit 60, a microprocessor-based control module 62, a visual display 64, a keyboard or equivalent operator data entry apparatus 66, a trainline interface module 68, a motor current module 70, and an electronic air brake system 72. The redundant radio transmitter and receiver 58 comprises two identical transmitters and two identical receivers (or transceivers). The receivers (or receiver sections) are always on when the system is in operation, but only one of the transmitters (or transmitter section) is on at a time. The transmitters may be toggled on or off in the event of a detected communication failure.

The specific configuration of a lead unit 52 and a remote unit $54_i$ will be described by an example command message, within a DPC train having a lead 52 and two remote units, $54_1$ and $54_2$ as shown in FIG. 2. The example operation will be described in the mode used after execution of a linking procedure, which transfers particular communication parameters, including which particular remote $54_i$ is allocated to which time slot of a time division multiple access channel allocation (TDMA) scheme.

Communication from the lead unit 52 to the remote units $54_1$ and $54_2$ is effected by the lead unit sending a command message having a source field, a destination field, and a command field. The source field contains the unique identifier for the particular lead unit. When a remote unit receives the command message, it compares the contents of the source field against its stored lead identifier and compares the contents of the message's destination field against the remote's own identification number. If both of these are matches, the receiving remote unit performs the function encoded in the message's command field. Each of the remote units $54_2$ and $54_2$, upon performing the command received from the lead unit 52, transmits a status message back. The status message indicates whether the command has been carried out and/or provides the lead unit with requested information. The status message is transmitted in a predetermined time slot measured from the time the command message is received. The lead unit 52 monitors the predetermined time slots and thereby detects a failure by one or more remote units to reply with a status message. In response to the detected failure, the lead unit 52 generates appropriate commands.

The remote units $54_1$ and $54_2$ can transmit alarm messages without receiving a command from the lead unit 52. This is done by first checking the channel to determine if the channel is clear for a predetermined delay period and then transmitting the alarm message to the lead unit. The lead unit 52 responds by acknowledging the receipt of the alarm message.

Radio-Based Electro-Pneumatic (EP) Control System

Figure 4:
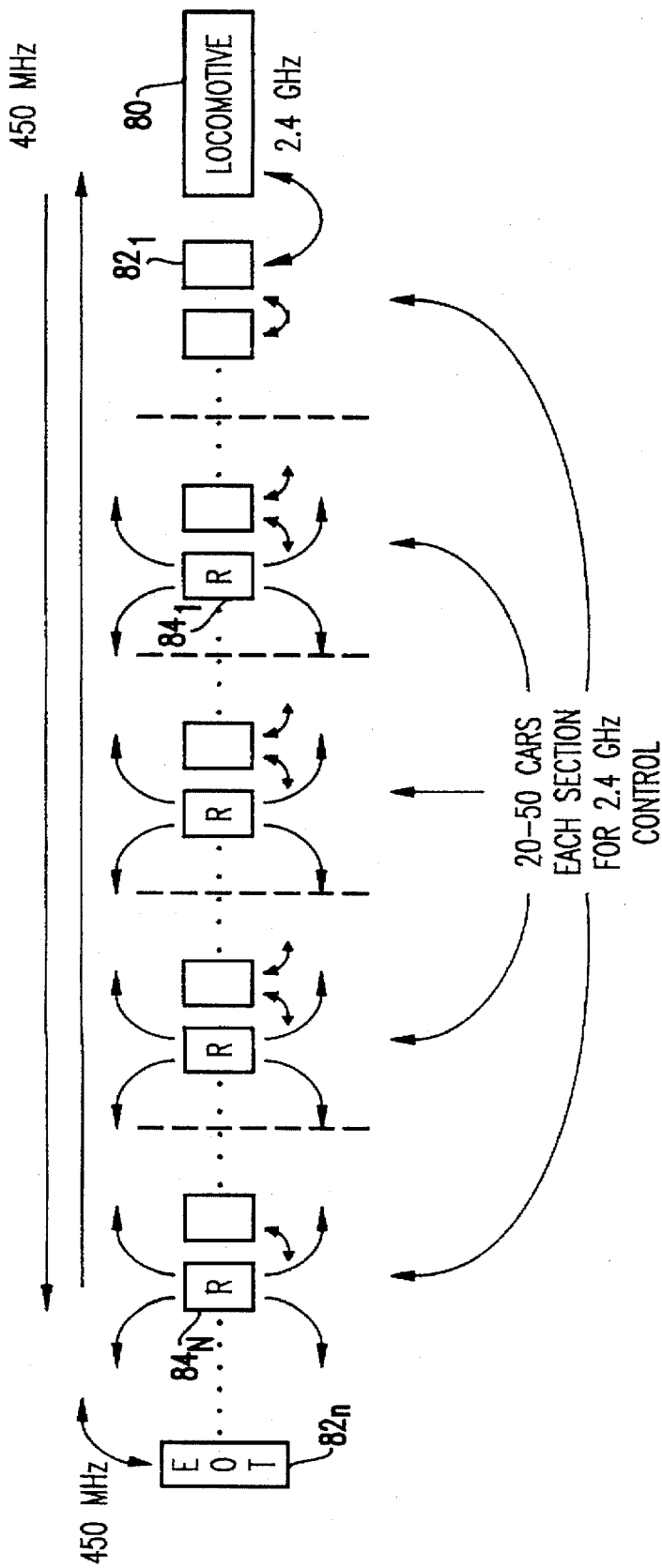
FIG. 4 is a block diagram showing radio-based electro-pneumatic control brake system communications according to the present invention.

An overview of the radio-based Electro-Pneumatic (EP) control brake system according to the present invention is shown in FIG. 4, to which reference is now made. A locomotive 80 is connected to a plurality of cars $82_1$ to $82_n$, some of which may be helper locomotives. The last car $82_n$ in the train carries the EOT unit (14 in FIG. 1). As will be explained in more detail hereinafter, the cars (and any helper or remote locomotives) are divided into a plurality of groups with selected cars $84_1$ to $84_N$ in each group being designated as repeaters. If a group includes a helper locomotive, that locomotive typically would be designated the repeater for that group. Each group comprises a predetermined number of cars, the repeater for the group being designated by the locomotive 80. This designation can dynamically change, depending on the condition of the radio communications between the lead locomotive and the current repeater. These conditions include a weak signal or loss of signal and a low battery condition status from the current repeater. Within a group, the cars communicate with the designated repeater, forming a wireless Local Area Network (LAN).

As described in more detail below, the linking strategy requires that lead locomotive know all car IDs and their order in the train. This, of course, includes any trailing locomotives in a DPC system. The groups and the repeater within each group are initially established by the lead locomotive during the linking procedure. Thereafter, the lead locomotive monitors the signal strength and battery condition status information from each of the repeaters, and if conditions warrant it, the lead locomotive may designate another car within a group to be the repeater.

RF Spectrum Considerations

The way in which the locomotive communicates with the repeaters and the other cars with the repeaters is determined in part by the RF spectrum resources available. The RF spectrum resources available to railroads are summarized below:

VHF (170 MHZ): Currently used for mobile voice, with no channels available for North American use. In the long term, the industry will change to digital voice/data capability; however, data applications are expected to be largely used for mobile to control office communications. If this band were to be used for EP brakes, 80 channel radios would be required, with a complex means of dynamically changing channels based upon location. The cost, technical complexities, and coordination problems would be too large to deal with for EP brakes.

UHF (450MHz): There are currently three duplex channels allocated to railroads (i.e., six frequencies). One is used for End of Train (EOT), and the other two are used for distributed power control (DPC). These are intra-train communications functions and represent the natural best choice for EP brake operation.

UHF (900 MHz): Six channel pairs have been provided for the AAR Advanced Train Control System (ATCS) project. Although only one railroad has invested in a major ground infrastructure for locomotive communications, other railroads are using these channels for point-to-point communications for pole line elimination. The ATCS protocol, with very high overhead, has limited the useful capacity of these frequencies, and it would not be practical to consider their use for intra-train communications.

Spread Spectrum: The FCC has three low power (one watt limit) unlicensed bands for spread spectrum communications: 900 MHZ, 2.4 GHz and 5.8 GHz. While the FCC allows anyone to use these bands, within defined limits, there is no protection from interference caused by others. Spread spectrum, when properly applied, can provide good protection from other users but can still be fairly easily "swamped out" by competing systems using the same band. In addition, the 900 MHz band is likely to become more "polluted" in the future due to introduction of PCS and other new systems. Therefore, use of the 900 MHz band can be largely discounted. The 2.4 GHz band has higher data rate capacity (i.e., more bandwidth) with less likely interference. The lower interference is due to its shorter range (nominal 300 feet) and the fact that most applications are indoors (e.g., office local area networks (LANs)). The wireless LAN market provides the mass market volumes to drive very high integration and low hardware costs. This being helped by establishment of Institute of Electrical and Electronic Engineers (IEEE)

Standard 802.11 for multi-vendor compatibility. The 5.8 GHz band is largely undeveloped to date with higher hardware costs and even shorter range.

The net result of the above is that licenses 450 MHz narrow band and unlicensed 2.4 GHz spread spectrum represent the most practical RF spectrum resources available. The 450 MHz band has the advantage of being protected, with good range ability, but the disadvantage of being limited in capacity. The 2.4 GHz band has the advantage of excellent capacity but the disadvantages of short range and no protection from other users.

The overall strategy is to operate EP brakes in a similar manner to Distributed Power Control (DPC). The DPC RF protocol (using one 450 MHz channel) is based upon allowing up to five distributed control points (e.g., locomotives) within the train. The lead locomotive serves as the master, with trailing units both repeating signals and responding with status updates. The protocol currently being used is with a 1200 bits per second (bps) modem, but using a new protocol at 4800 bps with Carrier Sense, Multiple Access (CSMA) protection allows for higher utilization of the current bands. The result of this is that with a new protocol, useable capacity is increased to over four times present standards. This allows all DPC operations to migrate to a single channel, freeing the other channel for EP brake operation.

Referring again to FIG. 4, using a single channel, EP commands are sent in broadcast mode at 450 MHz to all cars, and selected cars $84_1$ to $84_N$ are spaced through the train (e.g., $N \leq 5$) designated as repeaters. In this way, the transmission of brake commands closely follows DPC operation. The problem comes in receiving confirmation status responses from each car. Generally, a single 4,800 bps channel will be sufficient to support fast enough confirmation response for multiple hundred car trains within the same RF area. The response time needs to be tied to the overall objective of having the lead locomotive know its current brake status and capacity on a close to real time basis (nominally each twenty seconds).

The 2.4 GHz spread spectrum channel is used to establish high speed, short range communications within each group of cars in the train. Each of the designated repeater cars $84_1$ to $84_N$, spaced each twenty to fifty cars through the train, are assigned adjacent cars to manage as a local communications node. This effectively forms a "mini-LAN" with twenty to fifty cars reporting to and from a repeater car, using the 2.4 GHz channel at a very high data rate (up to 1 Mbps). This communications uses message hopping car-to-car, with a two to three car overlap, creating multiple repeats to get data to and from the designated repeater node.

The repeater cars $84_1$ to $84_N$ send back status messages to the lead locomotive 80 on the 450 MHz band, based upon consolidation of data from all of its assigned cars. Normal data to confirm braking action taking place provides a braking effort value associated with its entire block of assigned cars. For example, if the lead locomotive service brake request was for 50% of full service braking, and some cars within a repeater group were not performing, the return status message may be something like "45% provided, two cars cut-out". Where specific defects are determined, separate messages are sent to the locomotive, including the car identification (ID). However, this is done separately from the quick braking response feedback messaging.

Repeater cars can be given a higher level of control logic. If, in the previous example, individual cars had brakes cut-out, the repeater may ask other cars in its group to provide higher braking effort such that the entire group could meet the command request from the lead locomotive.

A summary of the communications strategy is therefore:

Lead locomotive EP commands sent via 450 MHz broadcasts using one channel, the other channels being reserved for EOT and DPC intra-train communications.

Designated repeaters repeat the 450 MHz locomotive EP command data.

Each car acts on the locomotive command (or its repeated message) directly.

Confirming status from each non-repeater car sent via 2.4 GHz to its designated repeater.

Each car acts as 2.4 GHz message repeaters for messages originated up to three cars away in a Local Area Network (LAN) composed of the cars in a designated group.

Repeaters send consolidated group status information to the locomotive via the 450 MHz EP channel.

Back-up mode of using 2.4 GHz to relay command data in event of 450 MHz failures.

Although there is no license protection for the 2.4 GHz operation, the reliability should be greatly enhanced by the short range application. Ideally, the radio design could also allow dynamic re-assignment of codes to allow switching, commanded by the repeater node over the 450 MHz band. This is used to minimize cross-talk between adjacent groups of cars.

The 450 MHz band, if taken from current DPC allocations, allows full power transmitters (40 watts). This high power is used only on locomotives, with cars limited to two to five watts, to reduce cost, battery load and undesired RF coverage. Although DPC bands use separate transmit and receive frequencies (5 MHz offset), it is preferable to use a single frequency for RF EP operation. This allows simpler implementation of CSMA and repeater operations, with lower cost radios.

In the event of intermittent communications losses, or mixed equipped/non-equipped train consists, the overall control system design allows two levels of fallback operation:

1. Revert to an overlay system where cars which are working act to help the conventional brake pipe reduction.

2. Revert to conventional brake operation, taking all actions from the brake pipe reductions, In any mode, emergency brakes are applied through rapid brake pipe reductions. This provides the ultimate safety back-up in the event of communications losses.

Rail Car Two-Band Radio Design

Figure 5:
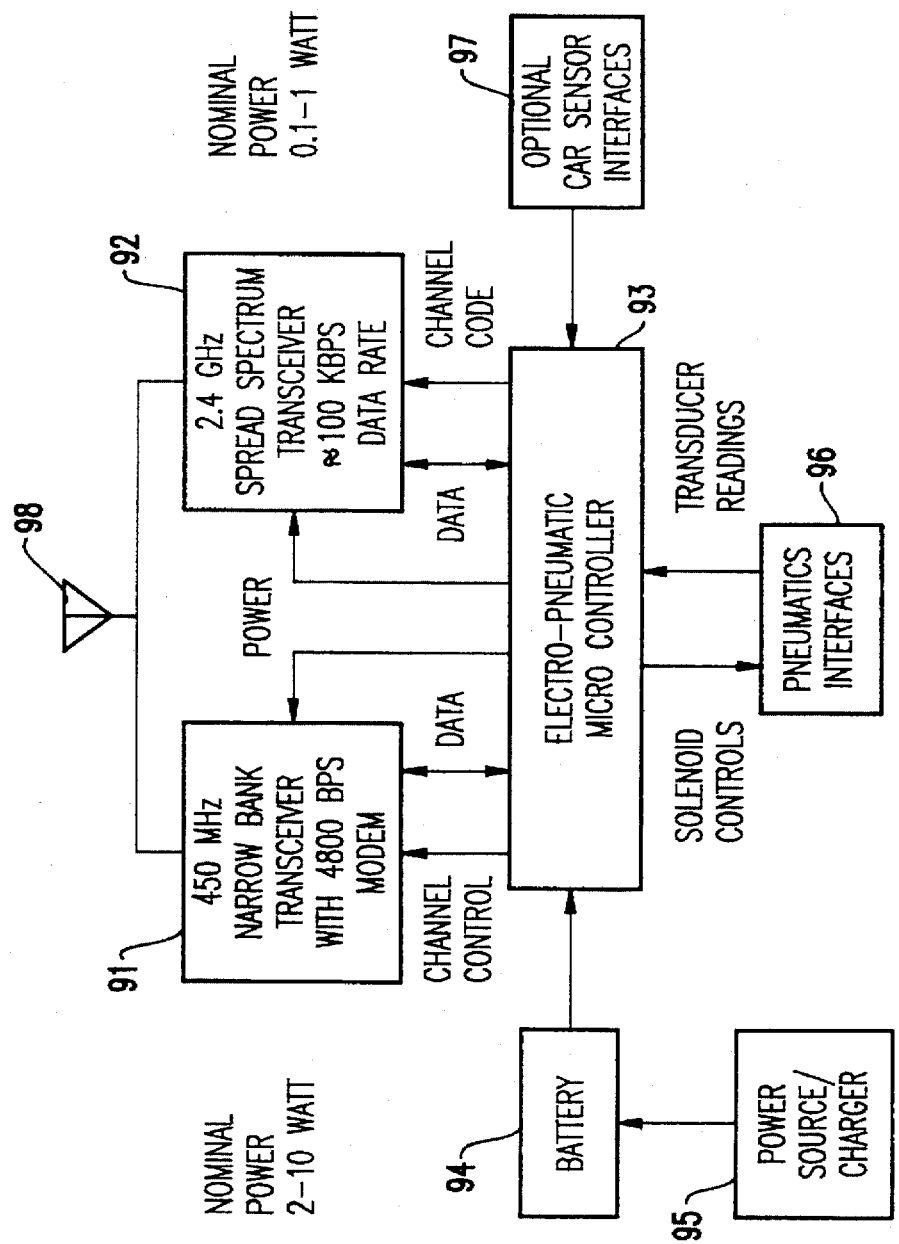
FIG. 5 is a block diagram showing radio-based electro-pneumatic control rail car configuration according to the invention.

FIG. 5 is a block diagram of the radio-based EP control rail car configuration according to the invention. Two transceivers 91 and 92 are used, one for 450 MHz communications and one for 2.4 GHz communications. While transceivers (combined transmitters and receivers in a single unit) are preferred, it will be understood by those skilled in the art that separate transmitters and receivers can be used to implement the functions of the transceivers 91 and 92 and such separate transmitters and receivers are the full equivalent of the transceivers. In some applications, and in the DPC system, a transmitter and/or receiver may already exist (installed equipment in the locomotive) and it is merely necessary to adapt the existing equipment to support the EP braking function.

The transceivers 91 and 92 communicate with and are controlled by a microcontroller 93, here called an Electro- Pneumatic microcontroller, which like the EOT unit shown in FIG. 1, includes a programmed microprocessor. The microcontroller 93 receives power from a battery 94 which is charged by a power source or charger 95. The power source or charger 95 may be in a rail yard and used to charge the battery 94 or it may be an on-board charger which continuously charges the battery 94 by an axle driven alternator or air driven turbine. If mounted in a trailing or remote locomotive, the power can be taken directly from that locomotive's power battery.

The microcontroller 93 supplies power to the transceivers 91 and 92 and, therefore, can control the power consumption by turning the transceivers on or off. Microcontroller 93 also provides channel control to the 450 MHz transceiver 91 and control code to the spread spectrum 2.4 GHz transceiver 92. The transceiver 91 receives command data from the locomotive and supplies this data to the microcontroller 93 which generates solenoid controls to the pneumatic interfaces 96 in response to the command data. The transceiver 92 is used to communicate with other cars in the group. If the car is a designated repeater, then status information is received from the other cars in the group, and this data is formatted by microcontroller 93 and transmitted using the 450 MHz transceiver 91 to the locomotive. This data comprises data relating to the braking of the individual cars and may include additional data, such as car motion and direction, battery condition and the like. This additional data is input to microcontroller 93 by optional car sensor interfaces 97.

The 2.4 GHz transceiver 92 does not use the full IEEE 802.11 protocol standards to allow optimization of the EP brake application requirements. Both transceiver designs make special provisions to allow very low power receiver operation. This includes on/off cycling, controlled by microcontroller 93 and coordinated with the protocol design. If needed, the system can keep the 2.4 GHz transceiver 92 normally off, and energized only after linking commands via the 450 MHz transceiver. An integrated, flat antenna 98 is used for both radios. Dual antennas, one for each side of the car, can be used to enhance communications reliability.

Lead Locomotive Radio Design

The locomotive system platform is very close to that for DPC intra-train communications. It would be clearly possible to have the locomotive system capable of "switch hitting" between DPC and RF EP brake operation. The same radio could be shared (depending upon ability to cover the narrow band needed), and a separate 2.4 GHz radio would be added to allow control of cars directly behind the lead unit.

Figure 6:
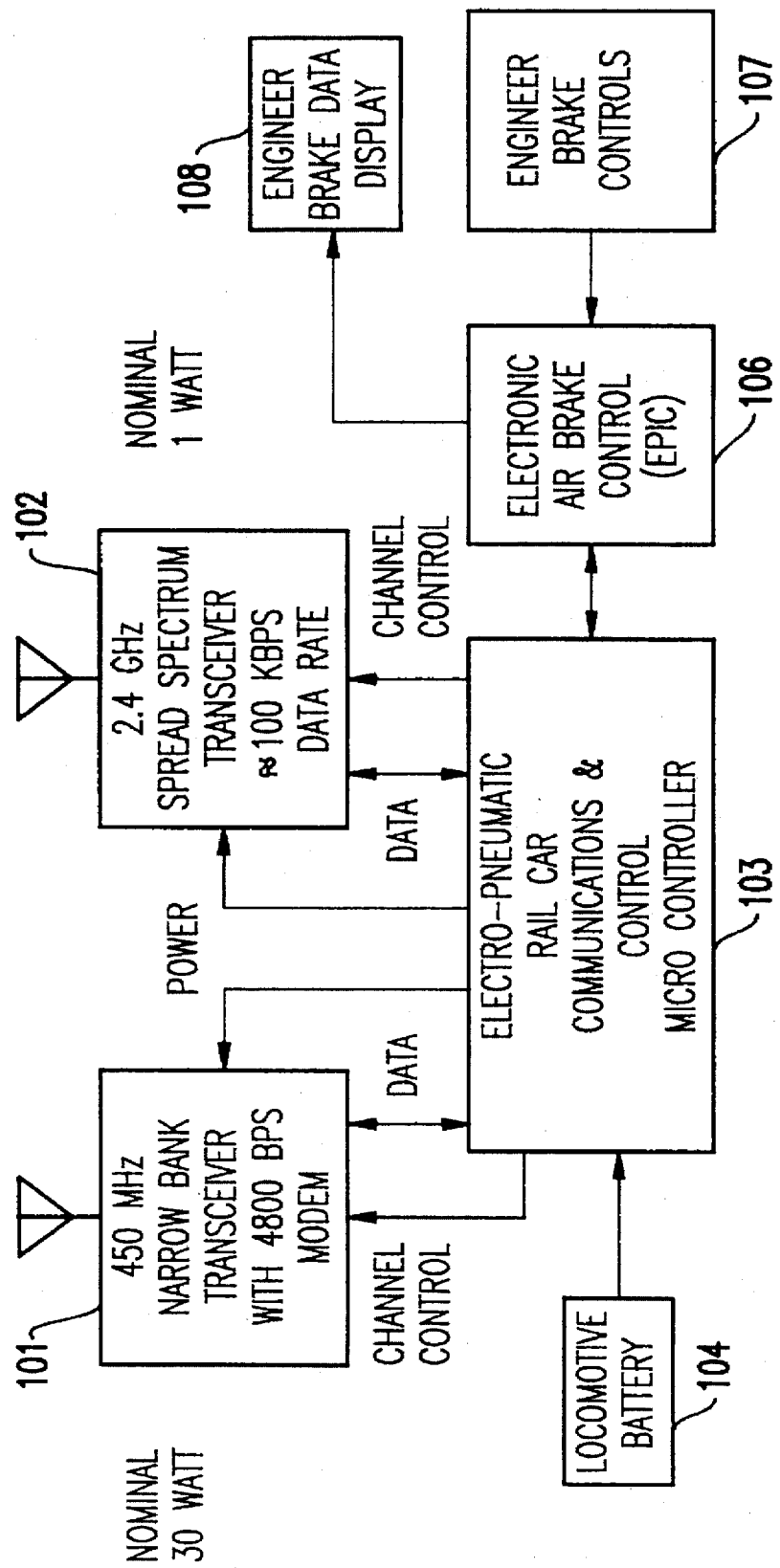
FIG. 6 is a block diagram showing a radio-based electro-pneumatic control locomotive configuration according to the invention.

The locomotive configuration is shown in FIG. 6, to which reference is now made. Like the rail car configuration, there are a 450 MHz transceiver 101 and a 2.4 GHz transceiver 102 controlled by a microcontroller 103, here labeled Electro-Pneumatic rail car communications control microcontroller. Again, the microcontroller 103 includes a programmed microprocessor. The microcontroller 103 receives power from the locomotive battery 104. The microcontroller 103 supplies power to the transceivers 101 and 102. Microcontroller 103 also provides channel control to the 450 MHz transceiver 101 and control code to the spread spectrum 2.4 GHz transceiver 102. The microcontroller 103 receives input from and provides output to the electronic air brake control 105. The input from control 105 is derived from sensors on the engineer brake controls 106. Based on this input, the microcontroller 103 generates the command data which is transmitted to the rail cars by the 450 MHz transceiver 101.

Data received from the transceiver 101 is formatted by microcontroller 103 and supplied to the engineer brake data display 107 via control 105. The 2.4 GHz transceiver 102 is used to receive data from cars in the immediate vicinity of the locomotive. These cars are not assigned to a repeater car but instead form a group reporting directly to the lead locomotive. (See FIG. 4.) The 2.4 GHz locomotive transceiver 102 provides the full one watt output power, as opposed to 100 mW on the car transceivers. This supports use for other applications, such as data exchange in the terminals or data links with signal systems.

Linking Strategy

The communications scheme clearly requires the lead locomotive to learn all of the car IDs as well as their order in the train. Equipped terminals receive a consist list over the 2.4 GHz transceivers from the railroad yard office or information system. A procedure at the locomotive tests the validity of the consist list while charging the brake pipe pressure. The car system is able to default to conventional brake operation, responding to reductions of brake pipe pressure. Therefore, an RF communications message must be received to advise start of the linking procedure. This prevents responding to conventional brake pipe reductions for a set time to allow reduction as part of the linking procedure without changing brake settings. In smaller terminals, the locomotive must determine the consist on its own. This is done by timing brake pipe pressure change cycles. Only the 450 MHz transceiver is used for initial reporting for each car, but the 2.4 GHz transceiver can be used a back-up.

Once the lead locomotive knows the consist, cars are identified by their order in the consist. The lead locomotive selects the 450 MHz repeater cars, and advises them accordingly, together with the communications group assignments. This may be in the form of "car 60 is a repeater, as group 2, and is assigned cars 45 to 75". In this case, car 50 would establish links with its assigned cars on the 2.4 GHz radio and report back to the lead when "group 2" is confirmed. After linking, 450 MHz communications use the lead locomotive number as the unique train identifier, together with the to/from repeater group number. Any messages containing individual car data also add the car number. Any addition or deletion of cars requires a re-linking procedure. This is a shortened procedure, without needing to make a brake pipe pressure reduction, by allowing manual entry of a new car's ID or a deletion of a removed car's ID in a locomotive terminal. In route, periodic consist checks are made by using the 2.4 GHz links to "daisy chain" link tests from car-to-car in sequence through the length of the train.

In both the initial linking and periodic in route tests, some number of failed or unlinked cars need to be tolerated. This is similar to current operating rules allowing up to 15% of cars to have their brakes cut-out. With a smart locomotive system, it would be possible to advise the crew of degraded braking capability based upon the numbers of cars cut-out or malfunctioning. This should allow tolerance of even higher numbers of cars cut-out, with speed restrictions imposed to maintain safe braking distances. Sufficient security and protection from multiple trains operation can be provided with well established addressing and encoding techniques in the protocol design, similar to that proven effective in current DPC and EOT operations. At some point in car failures, the braking operation reverts to conventional operation, with brake pipe reductions to control applications. This is done without need to broadcast RF commands, in the event of locomotive RF failures.

While the invention has been described in terms of a single preferred embodiment, those skilled in the art will recognize that the invention can be practiced with modification within the spirit and scope of the appended claims. In particular, those skilled in the art will understand that the specific frequencies used in the preferred embodiment are by way of example only and other and different frequencies may be selected in a specific implementation depending on current regulations and industry agreed standards.

Having thus described my invention, what I claim as new and desire to secure by Letters Patent is as follows:

1. A radio-based, Electro-Pneumatic (EP) rail car braking system for a railroad train having a lead locomotive and a plurality of rail cars, said EP rail braking system comprising:
   a plurality of rail car two-band radio systems, each rail car radio system being mounted on a rail car and including
   a two-band radio including a first narrow band high power transmitter and a second broad band low power transmitter,
   a first microcontroller controlling said two-band radio, and
   pneumatic interfaces responsive to control signals generated by said
      first microcontroller in response to commands received by
      said two-band radio on the first narrow band; and
   a locomotive radio system mounted on said lead locomotive, said locomotive radio system including a third narrow band high power transmitter,
   a second microcontroller controlling said third transmitter, and
   air brake control and display providing input and receiving output
      from said second microcontroller,
   said second microcontroller controlling said third transmitter to transmit commands to all rail cars in the train, selected rail cars spaced through the train being designated as repeaters with a predetermined number of cars assigned to each repeater forming a group of cars that act as a Local Area Network (LAN), wherein rail cars in a group communicate with each other using said second transmitter and in response to a command broadcast by the lead locomotive, rail cars in a group act on the command and transmit status information to their respective repeater and the repeater, in turn, transmitting back status messages to the lead locomotive on said first transmitter based on consolidation of data received from rail cars in its group.

2. The radio-based, Electro-Pneumatic (EP) rail car braking system recited in claim 1 wherein said second broad band transmitters are spread spectrum transmitters.

3. The radio-based, Electro-Pneumatic (EP) rail car braking system recited in claim 1 further comprising means for inputting linking data in said locomotive radio system which identifies rail cars in the train by location and unique identifier, said linking data being used to designate repeaters and cars assigned in a group to each repeater.

4. The radio-based, Electro-Pneumatic (EP) rail car braking system recited in claim 3 wherein said second microcontroller uses said linking data to designate which of the rail car two-band radio systems are repeaters and assign a predetermined number of cars to each repeater for form a group of cars that act as a Local Area Network (LAN).

5. The radio-based, Electro-Pneumatic (EP) rail car braking system recited in claim 4 wherein said second microcontroller monitors signal strength and reported battery condition status from designated repeaters and, should signal strength or battery condition fall below predetermined thresholds, designates a different rail car two-band radio system as a repeater.

6. The radio-based, Electro-Pneumatic (EP) rail car braking system recited in claim 4 wherein the second broad band low power transmitter rebroadcasts transmissions from other cars in a same group to form the group Local Area Network (LAN).

7. The radio-based, Electro-Pneumatic (EP) rail car braking system recited in claim 1 wherein the locomotive radio system is a two-band radio system including a broad band receiver receiving broadcasts from two-band radio systems mounted on rail cars.

8. The radio-based, Electro-Pneumatic (EP) rail car braking system recited in claim 1 wherein the railroad train further includes helper locomotives distributed through the train, the lead locomotive communicating with the helper locomotives with a radio based Distributed Power Control (DPC) system using a channel of a designated narrow frequency band, the EP rail braking system using a different channel of the same designated narrow frequency band.

9. The radio-based, Electro-Pneumatic (EP) rail car braking system recited in claim 1 wherein an End of Train (EOT) system is mounted on the railroad train, the EOT system including an EOT unit mounted on a last car of the train and communicating with the lead locomotive using a channel of a designated narrow frequency band, the EP rail braking system using a different channel of the same designated narrow frequency band.

10. The radio-based, Electro-Pneumatic (EP) rail car braking system recited in claim 1 wherein an End of Train (EOT) system is mounted on the railroad train, the EOT system including an EOT unit mounted on a last car of the train and communicating with the lead locomotive using a first channel of a designated narrow frequency band, and wherein the railroad train further includes helper locomotives distributed through the train, the lead locomotive communicating with the helper locomotives with a radio based Distributed Power Control (DPC) system using a second channel of the designated narrow frequency band, the EP rail braking system using a third channel of the same designated narrow frequency band.

11. A method for controlling Electro-Pneumatic (EP) rail car braking for a railroad train having a lead locomotive and a plurality of rail cars, the method comprising the steps of:
   mounting a plurality of rail car two-band radio systems on rail cars in the train, each radio system having a first narrow band high power transmitter and a second broad band low power transmitter;
   assigning the rail cars with two-band radio systems to one of several groups and designating a single rail car within each group as a repeater;
   broadcasting a command from said lead locomotive a command using a third narrow band high power transmitter;
   receiving the command at the rail cars with two-band radio systems;
   executing the command at the rail cars and transmitting a status report to the repeater for the respective rail car using the second broad band low power transmitter;
   receiving status reports from the rail cars within a group by the repeater for the group; and formatting status reports received by each repeater and transmitting a formatted status report to the lead locomotive using the first narrow band high power transmitter.

12. The method for controlling Electro-Pneumatic (EP) rail car braking recited in claim 11 further comprising the step of displaying received status reports in the lead locomotive.

13. The method for controlling Electro-Pneumatic (EP) rail car braking recited in claim 12 wherein cars within each of the several groups of cars form a Local Area Network (LAN) wherein rail cars within a LAN communicate by rebroadcasting transmissions from the broad band low power transmitters within the group.

14. The method for controlling Electro-Pneumatic (EP) rail car braking recited in claim 13 further comprising the steps of:

monitoring at the lead locomotive signal strength and reported battery condition status from designated repeaters; and designating a different rail car as a repeater within a group should monitored signal strength or reported battery condition status fall below predetermined thresholds.

15. The method for controlling Electro-Pneumatic (EP) rail car braking recited in claim 13 wherein the railroad train further includes helper locomotives distributed through the train, the lead locomotive communicating with the helper locomotives with a radio based Distributed Power Control (DPC) system using a channel of a designated narrow frequency band, wherein the steps of broadcasting a command and transmitting a status report use a different channel of the same designated narrow frequency band.

16. The method for controlling Electro-Pneumatic (EP) rail car braking recited in claim 12 wherein an End of Train (EOT) system is mounted on the railroad train, the EOT system including an EOT unit mounted on a last car of the train and communicating with the lead locomotive using a channel of a designated narrow frequency band, wherein the steps of broadcasting a command and transmitting a status report use a different channel of the same designated narrow frequency band.

17. The method for controlling Electro-Pneumatic (EP) rail car braking recited in claim 13 wherein an End of Train (EOT) system is mounted on the railroad train, the EOT system including an EOT unit mounted on a last car of the train and communicating with the lead locomotive using a first channel of a designated narrow frequency band, and wherein the railroad train further includes helper locomotives distributed through the train, the lead locomotive communicating with the helper locomotives with a radio based Distributed Power Control (DPC) system using a second channel of the designated narrow frequency band, wherein the steps of broadcasting a command and transmitting a status report use a third channel of the same designated narrow frequency band.

* * * * *